(No Model.)

J. H. MARVIL.
COVER FOR FRUIT BASKETS.

No. 338,179. Patented Mar. 16, 1886.

Witnesses.
Robert Everett.
J. A. Rutherford.

Inventor.
Joshua H. Marvil.
By James L. Norris.
Atty.

UNITED STATES PATENT OFFICE.

JOSHUA H. MARVIL, OF LAUREL, DELAWARE.

COVER FOR FRUIT-BASKETS.

SPECIFICATION forming part of Letters Patent No. 338,179, dated March 16, 1886.

Application filed February 9, 1886. Serial No. 191,333. (No model.)

*To all whom it may concern:*

Be it known that I, JOSHUA H. MARVIL, a citizen of the United States, residing at Laurel, in the county of Sussex and State of Delaware, have invented new and useful Improvements in Covers for Fruit-Baskets, of which the following is a specification.

My invention relates to covers for fruit-baskets, and the purpose thereof is to so construct the cover as to permit the contents of the basket to be heaped therein, while at the same time the fruit is securely confined in condition for transportation.

It is a further purpose of my invention to simplify and improve the construction of the basket-cover in such manner that the result proposed may be accomplished with the minimum of expense in construction.

The invention consists in the several novel features of construction and combinations of parts hereinafter fully set forth, and definitely pointed out in the claims annexed to this specification.

Figure 1:
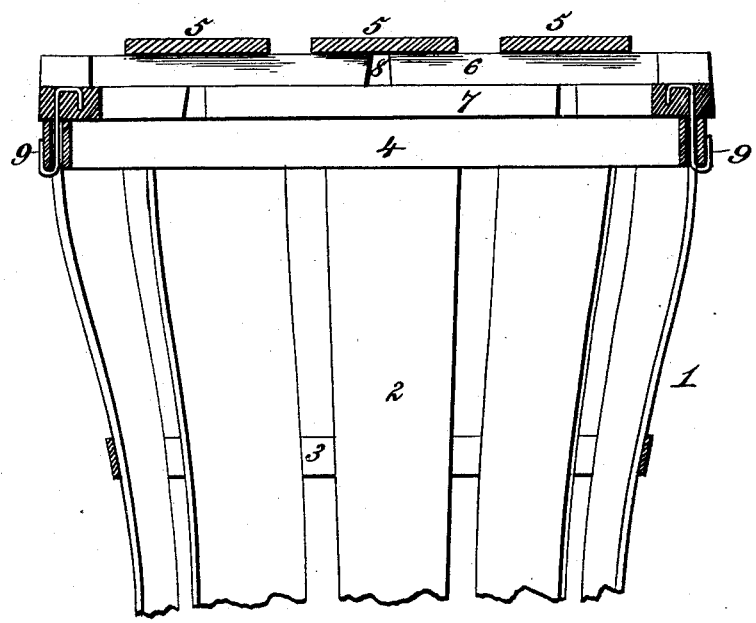
Figure 2:
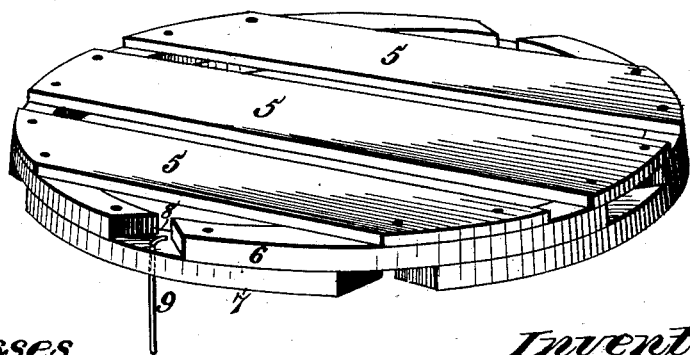

In the accompanying drawings, Figure 1 is a central section of the cover, together with a part of the body of the basket. Fig. 2 is a perspective view of the cover detached.

In the said drawings the reference-numeral 1 designates the body of the basket, composed of splints 2, braced by an intermediate hoop, 3, and attached to a chine, 4. The construction of this basket is not essentially different from what is already known.

The cover of the basket is composed of flat strips 5, tacked to a rim, which is composed of two or more series of separate fellies, 6 and 7, each of which is a fractional part of the complete annulus, and each series being so arranged that its members shall break joints with the members of the series above or below. The adjacent ends of each of the fellies are formed as shown in Fig. 2, being cut off at an angle to the radius of the circle, and a space, 8, being left between the adjacent points.

As already stated, the members of the series 6 break joints, or, in other words, the spaces between their ends alternate with the like spaces between the ends of the fellies in series 7. By this construction the top slats, 5, of the cover are raised above the rim composed of the fellies in series 6 and 7 in such manner that when the cover is placed upon the basket a space is left between the top of the cover and the upper edge of the chine 4, which permits the fruit to be piled or heaped in the basket, while at the same time ample ventilation is permitted, and the fruit is securely held in transit.

In order to fasten the cover upon the basket in the cheapest and simplest manner, and at the same time most securely, I drive wires 9 down through the lower series of fellies, 7, between the ends of the members of the upper series, 6. These wires, when the cover is placed upon the chine 4, are projected down between the inner and outer hoops of the chine and between the adjacent slats of the basket-body, whereby they may be bent around the chine and hold the cover securely in place, thereby confining the piled or heaped-up fruit in the basket during transportation.

By this invention I am able to furnish at a very low price a basket for containing and transporting fruit in bulk, in which the fruit may be heaped above the top of the basket, and thereby give a better sample of the same and present the appearance, as well as show the fact, of a more generous measure than is possible in baskets of the patterns now in use.

It is evident that the basket and cover may be made either round or square, or of any polygonal shape desired, without departing from my invention.

Having thus described my invention, what I claim is—

1. In a fruit-basket, a cover composed of slats, attached to a rim composed of sections of a complete circumference arranged in two or more series, the spaces between the same breaking joints in the adjacent series, substantially as described.

2. In a fruit-basket, the combination, with the chine thereof, of a cover having a rim composed of sections or fellies arranged in two or more series, one placed upon the other, the spaces between the fellies in one series breaking joints with those of the next series, substantially as described.

3. In a fruit-basket, the combination, with the chine thereof, of a cover having a rim composed of two or more series of fellies, each cut at the ends at an angle with the radius to form an open space, and wires driven through the lower series and projecting below the same to engage with the chine of the basket, the spaces between the fellies of the upper series breaking joints with those of the lower, substantially as described.

In testimony whereof I affix my signature in presence of two witnesses.

JOSHUA H. MARVIL.

Witnesses:
   H. F. MARVIL,
   JOHN H. ELLIOTT.